United States Patent [19]
Yamauchi

[11] Patent Number: 5,973,468
[45] Date of Patent: Oct. 26, 1999

[54] MAGNETIC BEARING DEVICES

[75] Inventor: Akira Yamauchi, Narashino, Japan

[73] Assignee: Seiko Seiki Kabushiki Kaisha, Japan

[21] Appl. No.: 08/897,019

[22] Filed: Jul. 18, 1997

[51] Int. Cl.[6] .............................. H02K 7/09; F16C 39/06
[52] U.S. Cl. .......................... 318/610; 318/629; 318/630; 318/632; 310/90.5
[58] Field of Search ..................................... 318/610–646; 310/90.5, 90; 361/160, 174

[56] References Cited

U.S. PATENT DOCUMENTS

| | | | |
|---|---|---|---|
| 4,686,404 | 8/1987 | Nakazeki et al. ...................... | 310/90.5 |
| 4,885,491 | 12/1989 | Hiyama et al. ........................ | 310/90.5 |
| 5,530,306 | 6/1996 | Ueyama ................................. | 310/90.5 |
| 5,703,424 | 12/1997 | Dorman ................................. | 310/90.5 |
| 5,736,802 | 4/1998 | Ueyama et al. ....................... | 310/90.5 |
| 5,754,425 | 5/1998 | Murakami ............................. | 364/160 |
| 5,760,510 | 6/1998 | Nomura et al. ....................... | 310/90.5 |
| 5,760,511 | 6/1998 | Nakagawa et al. ................... | 310/90.5 |

Primary Examiner—Paul Ip
Attorney, Agent, or Firm—Adams & Wilks

[57] ABSTRACT

To provide magnetic bearing devices capable of preventing undesirable consequences caused by conical mode or parallel mode resonance which is liable to occur during acceleration of a rotor. A band-pass filter 24 is connected in series with a PID control circuit 12 is for improving stiffness in a specific frequency band. A displacement of a rotor 2 detected by a displacement detector 30 is entered to a switcher 32. On the other hand, a rotational speed sensor 7 detects the revolving speed, and a compensator switching discriminator 26 causes a switch 32s of the switcher 32 to connect to an output terminal 32b or to an output terminal 32c when the revolving speed coincides with preset revolving speed data. The preset revolving speed data defines specific revolving speeds occurring below and above a frequency band which includes a first conical mode resonant frequency and a second conical mode resonant frequency. The position of the rotor 2 is adjusted by a magnetic bearing 38 based on an output of the PID control circuit 12.

10 Claims, 12 Drawing Sheets

MAGNETIC BEARING DEVICES

BACKGROUND OF THE INVENTION

The present invention relates to magnetic bearing devices and, more particularly, to magnetic bearing devices capable of preventing undesirable consequences caused by conical mode or parallel mode resonance which is likely to occur during acceleration of a rotor.

Figure 9:
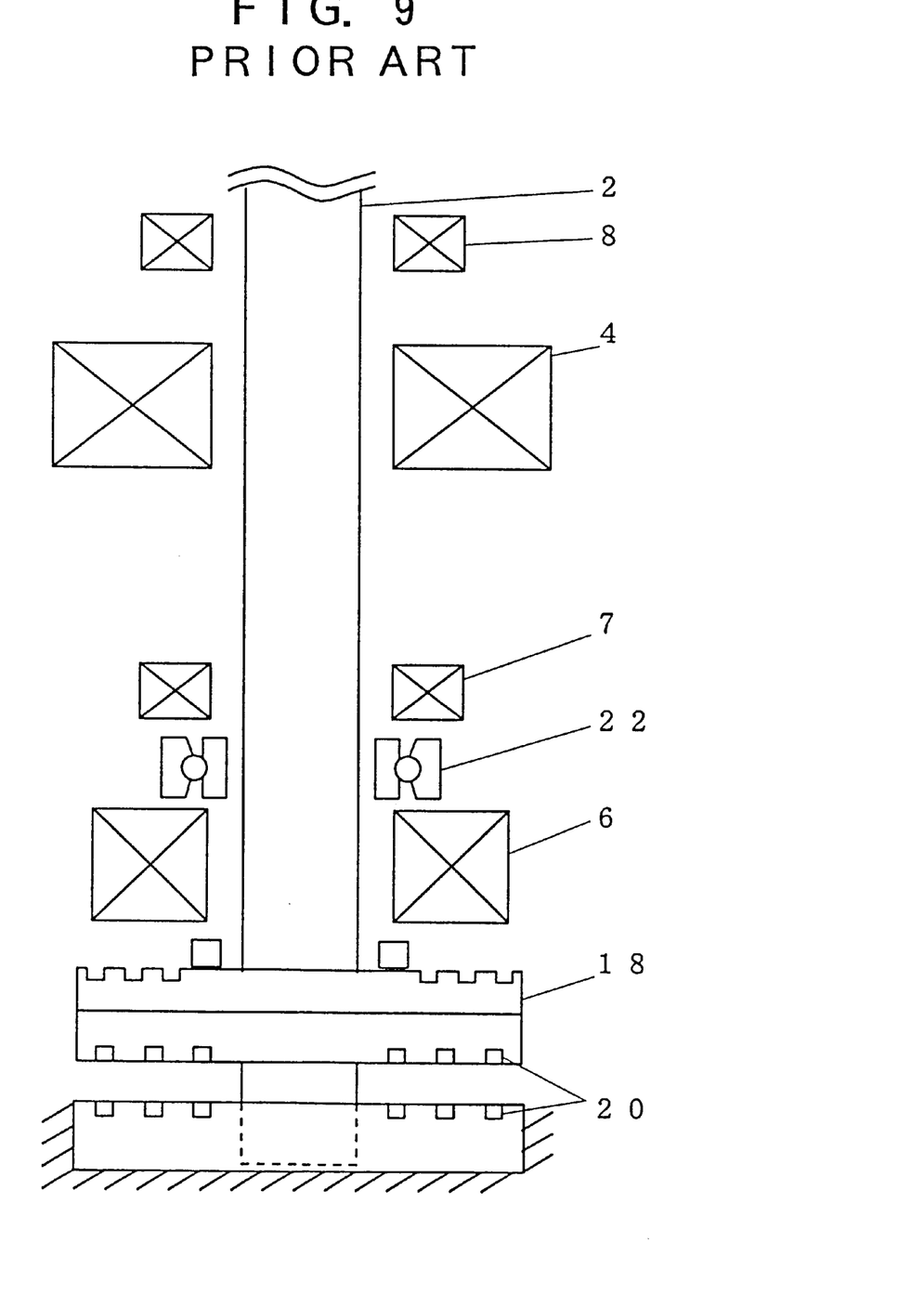
FIG. 9 is a general constructional diagram of a turbomolecular pump provided with a conventional three-axis-controlled magnetic bearing.
Figure 10:
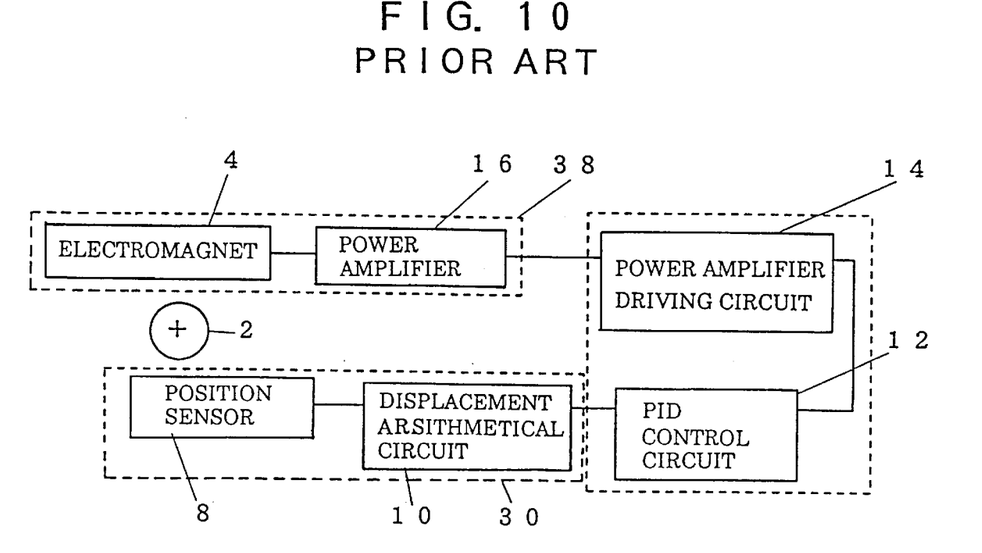
FIG. 10 is a block diagram showing an arrangement for radial position control performed in the conventional three-axis-controlled magnetic bearing.
Figure 11:
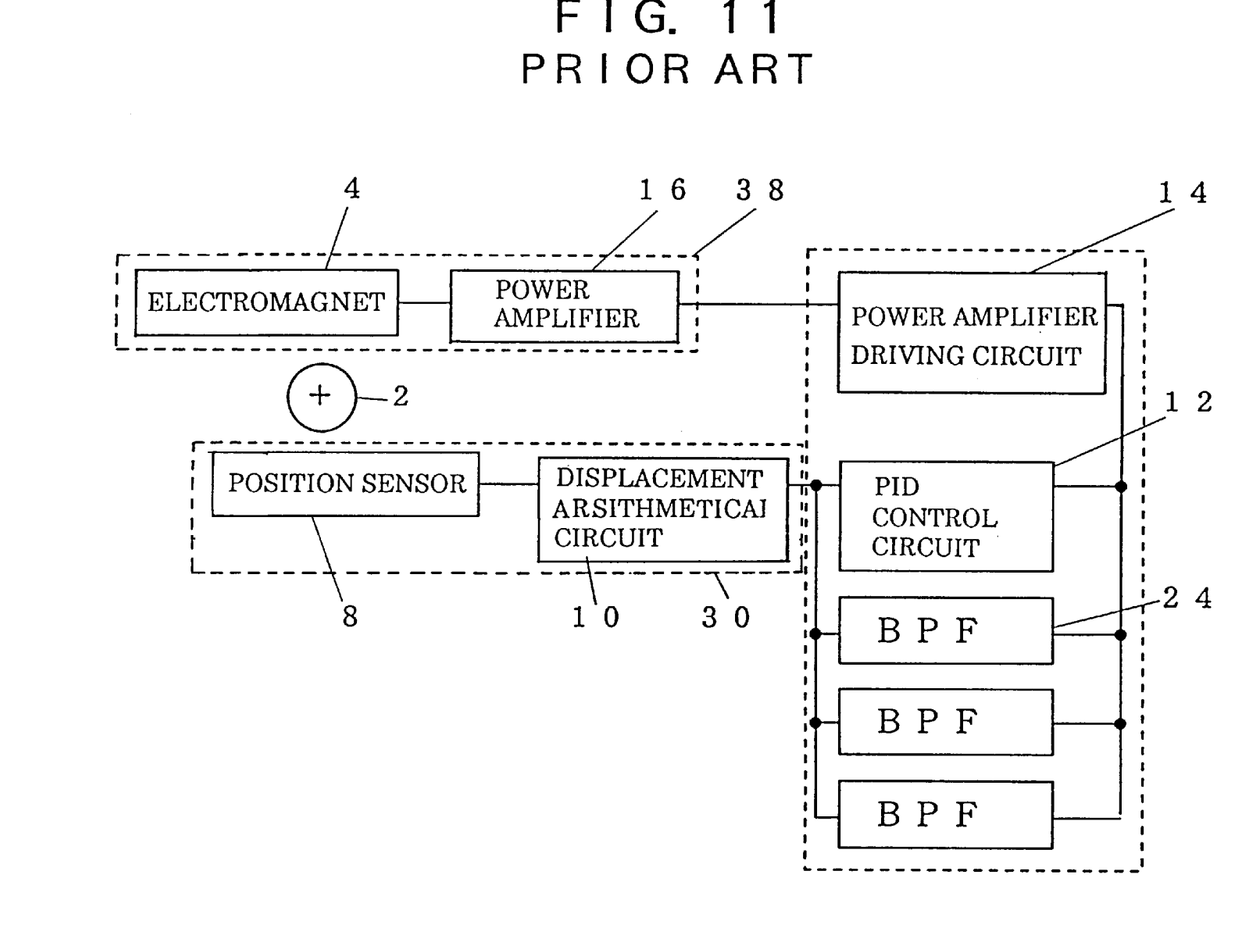
FIG. 11 is a block diagram showing an arrangement for radial position control performed in a magnetic bearing by using (parallel-connected) band-pass filters.

FIG. 9 shows a general constructional diagram of a turbomolecular pump provided with a three-axis-controlled magnetic bearing. The three-axis-controlled magnetic bearing employs a radial electromagnet 4 and an axial electromagnet 6 to keep a rotor 2 levitated by magnetic force. The revolving speed of the rotor 2 is detected by a rotational speed sensor 7. FIG. 10 is a block diagram showing an arrangement for radial position control performed in a conventional magnetic bearing device. For controlling the position of the rotor 2 in its radial direction, a displacement detector 30 comprises a radial position sensor 8 to detect the position of the rotor 2 and a displacement arithmetical circuit 10 to calculate its displacement. An output of the displacement arithmetical circuit 10 is passed through a PID control circuit 12 which has a PID control function, and is amplified in power by a power amplifier driving circuit 14 and a power amplifier 16. Then, the radial electromagnet 4 is driven to actively control the rotor 2. It is understood from the foregoing that the position control of the rotor 2 is carried out based simply on its displacement as detected by the radial position sensor 8. Since the radial position sensor 8 is mounted at a higher position than the center of gravity (not shown) of the rotor 2, it monitors displacements of an upper portion of the rotor 2. On the other hand, the displacement of a lower portion of the rotor 2, i.e., the portion lower than its center of gravity, is passively controlled by the axial electromagnet 6, an armature 18 and permanent magnets 20. Therefore, the lower portion of the rotor 2 can produce large deflecting motion which can cause the lower portion to go into contact with a touch-down bearing 22 when the rotor 2 is accelerated and its revolving speed reaches a resonant point which is characteristic of the turbomolecular pump. This deflecting motion involves simultaneous conical motions of both the upper and lower portions of the rotor 2 about its center of gravity. This phenomenon can cause wear of the bearing or temporary vibration. While the resonant point of this kind tends to vary depending on the revolving speed of the rotor 2, such deflecting motion is generally divided into motions in two directions according to the revolving speed, in which the motions in the two directions occur around a common stationary point. These motions are backward turning motion (precession) directed opposite to the revolving direction and forward turning motion (nutation) directed in the same direction as the revolving direction. Here, a point where resonance due to precession coincides with the revolving speed of the rotor 2 is defined as a first conical mode resonant point, while a point where resonance due to nutation coincides with the revolving speed of the rotor 2 is defined as a second conical mode resonant point. Besides these conical mode resonances, the turbomolecular pump can occasionally produce parallel mode resonance due to translational motion of the rotor 2, and this parallel mode resonance can also cause the rotor 2 to go into contact with the touch-down bearing 22 or temporary vibration to occur. In actuality, the conical mode resonance and parallel mode resonance occur simultaneously and they are combined in a complex manner in many cases. To avoid inconvenience which can occur at resonant points in such conical mode and parallel mode resonances, Japanese Unexamined Patent Publication No. 7-248021 discloses a method for improving stiffness in a low frequency range by connecting a plurality of band-pass filters 24 in parallel with the PID control circuit 12 as shown in FIG. 11.

Figure 12:
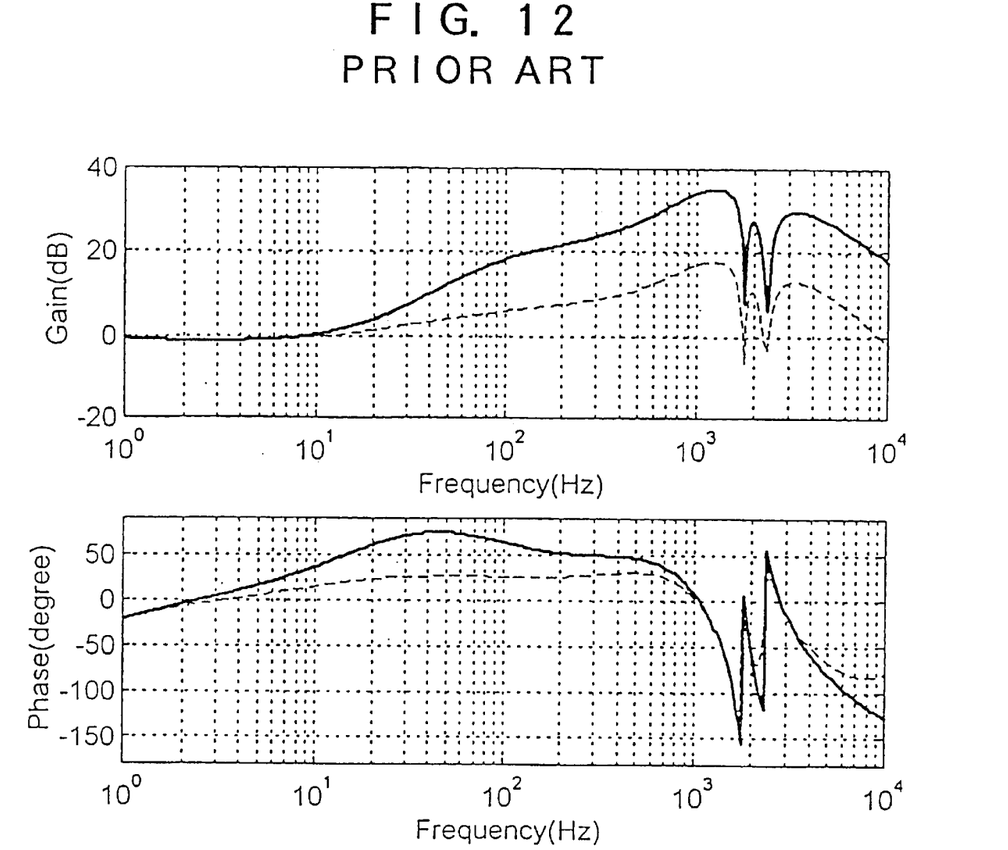
FIG. 12 shows Bode diagrams providing a comparison between a case where band-pass filters are series-connected with a PID control circuit and a case where the band-pass filters are parallel-connected with the PID control circuit.

Although provision of a plurality of band-pass filters 24 connected in parallel with the PID control circuit 12 will be advantageous to a certain extent in allowing the rotor 2 to exceed a conical mode resonant point, for instance, an improvement in stiffness in a much lower frequency range is desired in order to enable the rotor 2 to go beyond the resonant points in a stable manner. In this respect, a conventional circuit configuration in which the band-pass filters 24 consisting of phase lead elements alone are parallel-connected with the PID control circuit 12 is associated with the following problem as compared to a circuit configuration in which the band-pass filters 24 are series-connected with the PID control circuit 12. FIG. 12 shows Bode diagrams providing a comparison between a case where band-pass filters are series-connected with a PID control circuit and a case where the band-pass filters are parallel-connected with the PID control circuit. Solid lines in this Figure are for the configuration employing a series connection while broken lines are for the configuration employing a parallel connection. It can be seen from FIG. 12 that the parallel connection is less effective than the series connection in increasing gain or advancing phase when the same band-pass filters are used. Furthermore, analysis of transfer functions, for instance, becomes more complicated in the parallel connection compared to the series connection.

SUMMERY OF THE INVENTION

The invention has been made in the light of the aforementioned problems of prior art technology, and it is an object of the invention to provide magnetic bearing devices capable of preventing undesirable consequences caused by conical mode or parallel mode resonance which is liable to occur during acceleration of a rotor.

Accordingly, the invention (claim 1) is constructed by comprising a radial sensor for measuring the position of a rotor in its radial direction, displacement arithmetical means for processing a displacement measured by the radial sensor, first compensating means for improving stiffness in a frequency band including at least a first conical mode resonant frequency and a second conical mode resonant frequency upon receiving an output of the displacement arithmetical means, second compensating means for correcting an output of the first compensating means, power amplification means for power-amplifying an output of the second compensating means, and a radial electromagnet for controlling the position of the rotor in its radial direction based on an output of the power amplification means.

In another aspect of the invention (claim 2), there are provided a radial sensor for measuring the position of a rotor in its radial direction, displacement arithmetical means for processing a displacement measured by the radial sensor, a rotational speed sensor for measuring the revolving speed of the rotor, compensation switching means for connecting a conductor or first compensating means which improves stiffness in a frequency band including at least a first conical mode resonant frequency and a second conical mode resonant frequency to a next stage of the displacement arithmetical means when the revolving speed measured by the rotational speed sensor coincides with preset revolving speed data, second compensating means for correcting an output of the compensation switching means, power amplification means for power-amplifying an output of the second compensating means, and a radial electromagnet for controlling the position of the rotor in its radial direction based on an output of the power amplification means, wherein the preset revolving speed data defines at least one of specific revolving speeds occurring below and above the frequency band including the first conical mode resonant frequency and the second conical mode resonant frequency.

In still another aspect of the invention (claim 3), the compensation switching means connects the conductor or one of a plurality of compensating means to the next stage of the displacement arithmetical means when the revolving speed measured by the rotational speed sensor coincides with the preset revolving speed data, the compensating means individually having different frequency bands, and the whole compensating means having a frequency band including at least the first conical mode resonant frequency and the second conical mode resonant frequency, and the preset revolving speed data defines a plurality of revolving speeds including those occurring below and above the first conical mode resonant frequency as well as those occurring below and above the second conical mode resonant frequency.

In yet another aspect of the invention (claim 4), the compensating means is a band-pass filter which improves stiffness in a specific range within a frequency band including the first conical mode resonant frequency $F_1$, the second conical mode resonant frequency $F_2$ and a third frequency $F_3$ $(=F_1+2(F_2-F_1))$.

DETAILED DESCRIPTION OF THE DRAWINGS

Figure 1:
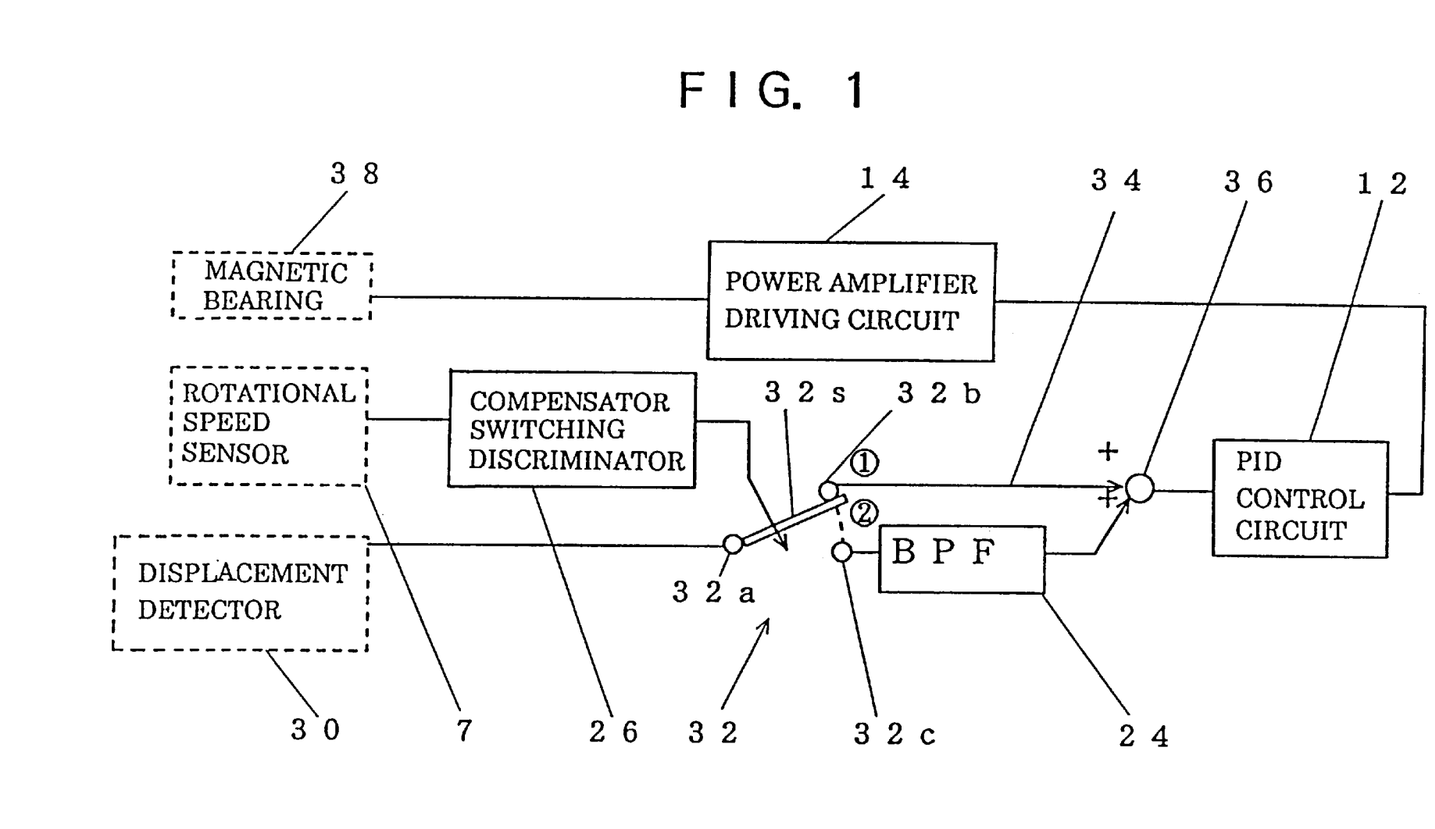
FIG. 1 is a block diagram showing a first embodiment of the invention.

Embodiments of this invention are now described below with reference to the attached drawings, in which elements identical to those depicted in FIG. 10 are designated by the same reference numerals and a description of such elements is omitted here. Referring to FIG. 1 illustrating a first embodiment of the invention, a displacement detector 30 includes a radial sensor 8 and a displacement arithmetical circuit 10. An output of the displacement detector 30 is delivered to an input terminal 32a of a switcher 32. An output terminal 32b of the switcher 32 is connected to one end of a conductor 34. Another output terminal 32c of the switcher 32 is connected to one end of a band-pass filter 24, which corresponds to first compensating means. A compensator switching discriminator 26 alters connections of a switch 32s of the switcher 32 in accordance with the revolving speed measured by a rotational speed sensor 7. A coupler 36 is connected to the other end of the bandpass filter 24 as well as to the other end of the conductor 34. The coupler 36 is for adding an output of the band-pass filter 24 and an output through the conductor 34 together, and constitutes compensation switching means together with the compensator switching discriminator 26 and the switcher 32. A PID control circuit 12 is for performing positional compensation based on PID constants, and corresponds to second compensating means. A power amplifier driving circuit 14 and a power amplifier 16 work together to amplify an output of the PID control circuit 12 to provide increased output power, and correspond to power amplification means. A magnetic bearing 38 contains the power amplifier 16 and a radial electromagnet 4.

Now, an operational description is given below.

Figure 2:
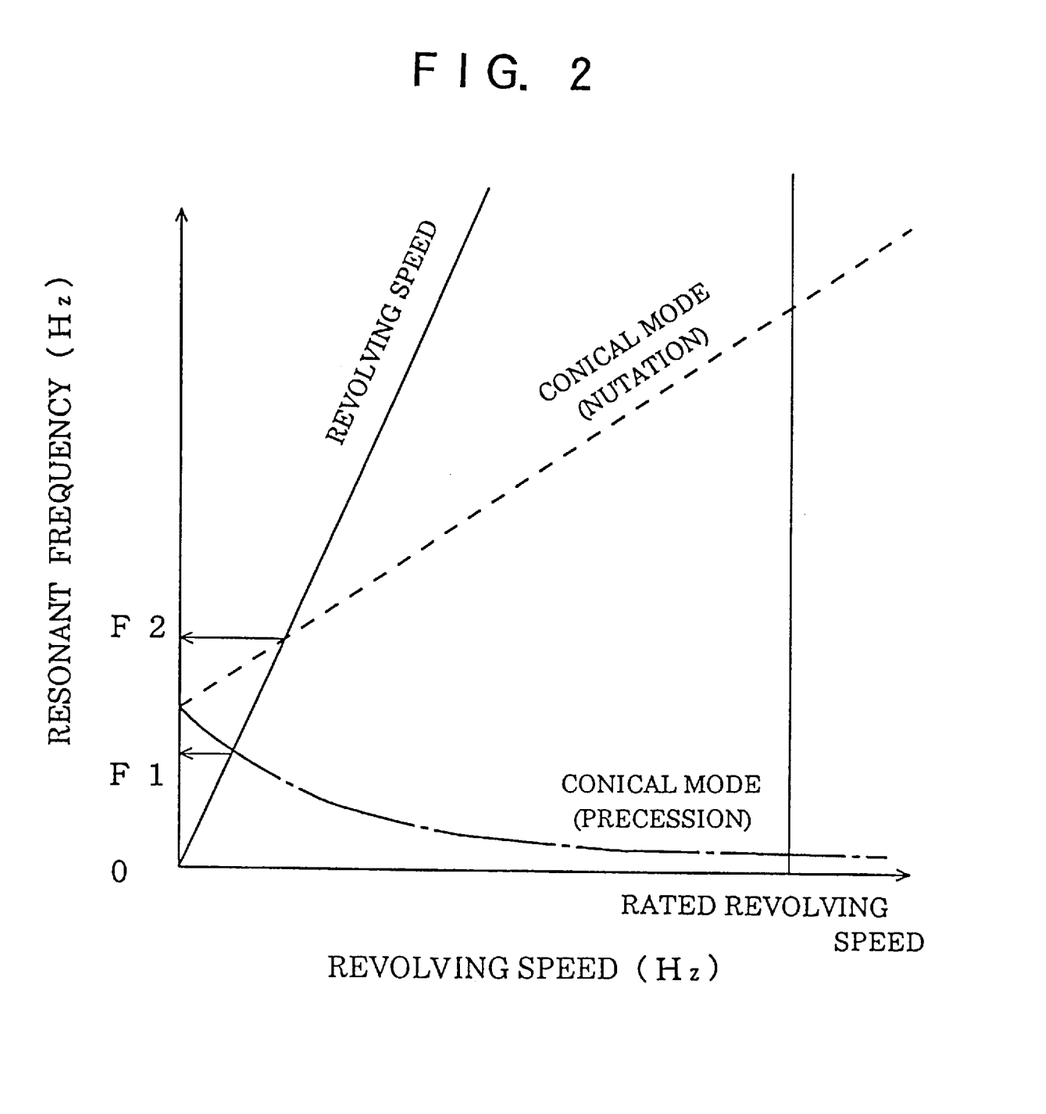
FIG. 2 shows the variation of the conical mode resonant frequencies according to the rotation speed.
Figure 3:
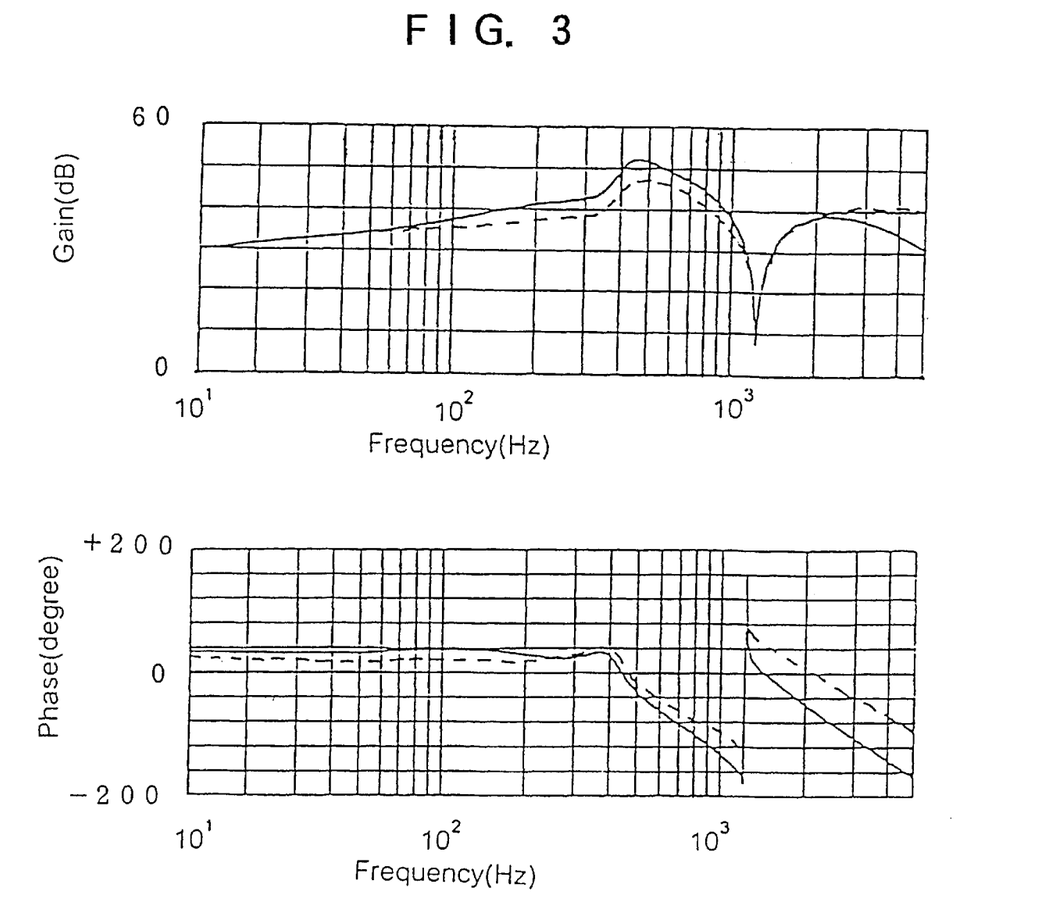
FIG. 3 shows Bode diagrams of a whole compensator obtained when a band-pass filter capable of improving stiffness at both first and second conical mode resonant frequencies is connected in series with a PID control circuit.

As shown in FIG. 1, the band-pass filter 24 is connected in series with the PID control circuit 12 to provide much more improved stiffness as compared to the prior art technology. The displacement detector 30 senses displacements of a rotor 2, and each displacement is entered to the switcher 32. On the other hand, the rotational speed sensor 7 detects the revolving speed, and the compensator switching discriminator 26 causes the switch 32s of the switcher 32 to connect to the output terminal 32b or to the output terminal 32c depending on the revolving speed. Timing of this switching operation is controlled as follows. When using a turbomolecular pump having a rated revolving speed (upon which rotation speed the conical resonant frequencies depend as shown in FIG. 2) of about 32,500 rpm, for example, conical mode resonant points agreeing with the revolving speed exist at about 2,500 rpm (which corresponds to a first conical mode resonant frequency F1) and about 4,800 rpm (which corresponds to a second conical mode resonant frequency F2). To provide an operating frequency band covering these two resonant points with the band-pass filter 24, the switch 32s is connected to the output terminal 32c within a range of 1,000 to 6,500 rpm, for example. On the contrary, the switch 32s is connected to the output terminal 32b in ranges of 0 to 1,000 rpm, and 6,500 rpm and over. The coupler 36 adds the output of the band-pass filter 24 and the output through the conductor 34 together. In one alternative, the coupler 36 may be composed of a switch which has a similar function to the switcher 32 and is interlocked with the switcher 32. In another alternative, if the switching between the output terminals 32b and 32c is stable and sure, the downstream ends of the band-pass filter 24 and the conductor 34 may simply be connected together. Frequency response obtained when the band-pass filter 24 and the PID control circuit 12 are connected in series is depicted in Bode diagrams shown in FIG. 3. As can been seen from this Figure, this circuit configuration can improve the stiffness around both the first and second conical mode resonant frequencies. In this configuration, the band-pass filter 24 consisting of first-order phase lead elements has cutoff frequencies of 80 Hz and 150 Hz. This means that normal operation is possible at frequencies in other than a frequency band including the conical mode resonant frequencies, whereas conical mode resonance can be suppressed in the frequency band including the conical mode resonant frequencies. If, however, problems such as a reduction in gain or a phase lag do not occur at frequencies in other than the frequency band including the conical mode resonant frequencies, the output of the displacement detector 30 may be passed through the band-pass filter 24 continuously after startup.

Figure 4:
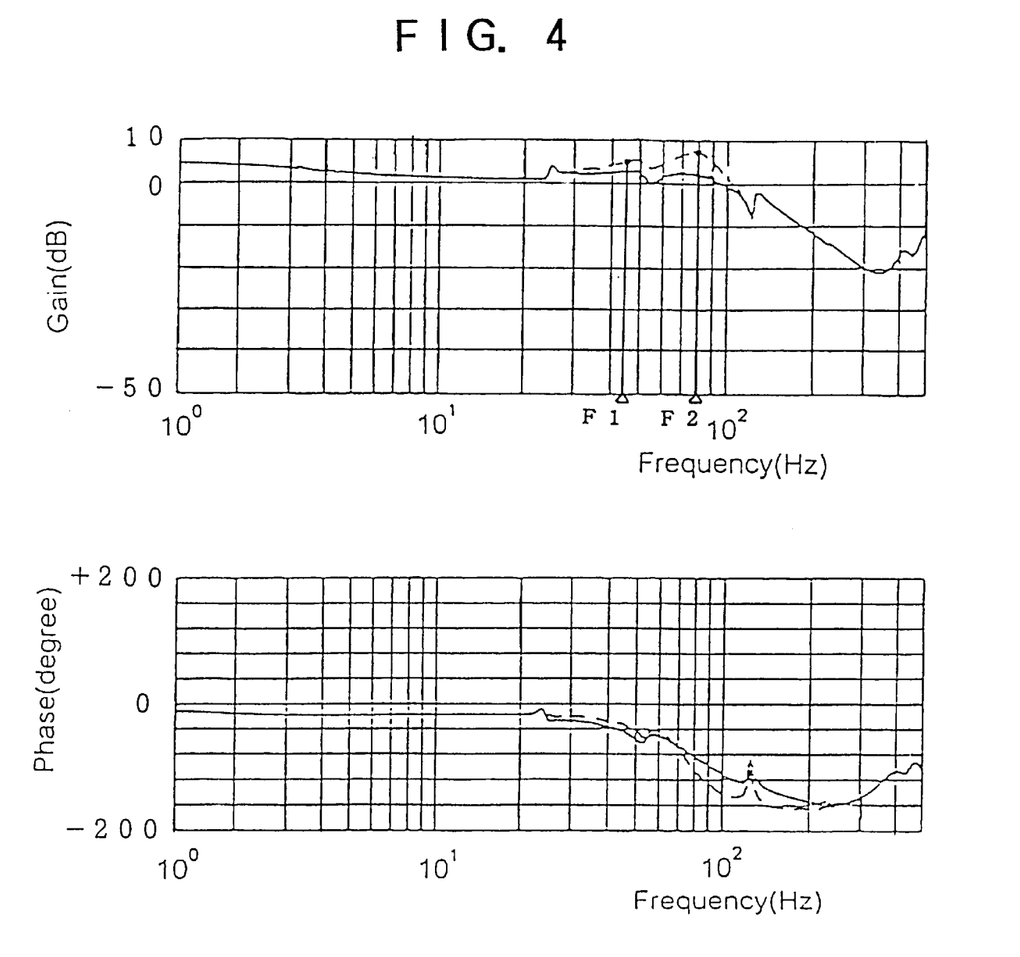
FIG. 4 is a diagram showing frequency responses of closed loop systems including a system to be controlled.
Figure 5:
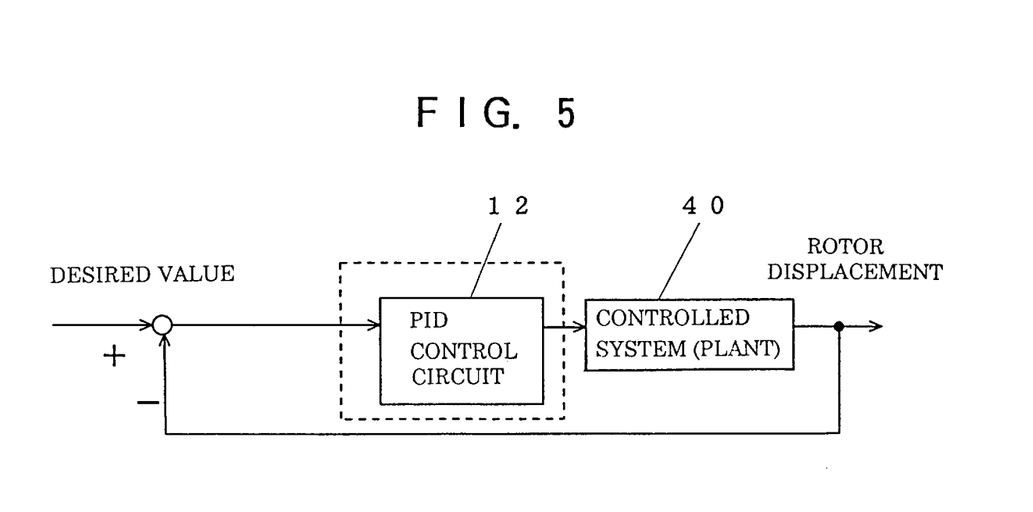
FIG. 5 is a configuration diagram of a closed loop system including a controlled system.
Figure 6:
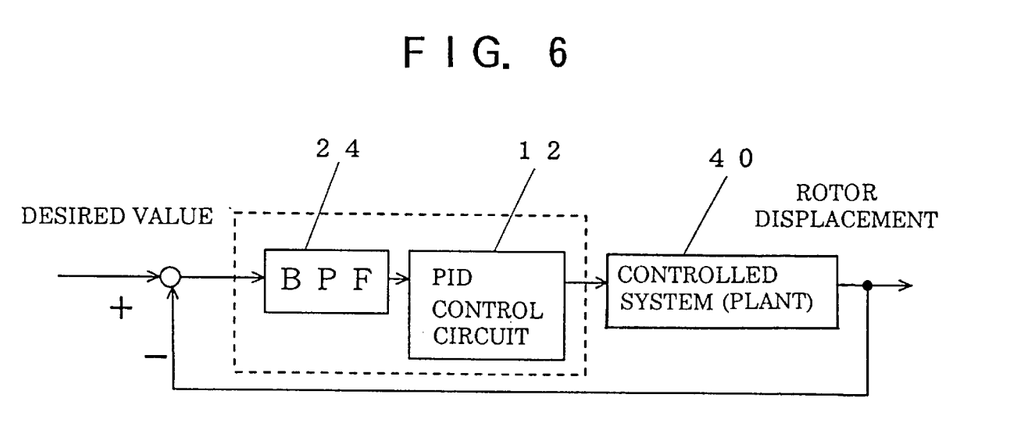
FIG. 6 is a configuration diagram of a closed loop system in which a band-pass filter is inserted.

FIG. 4 shows frequency responses of closed loop systems including a system to be controlled. Broken lines in this Figure show frequency responses obtained when a controlled system 40 is adjusted only by the PID control circuit 12 as in a configuration depicted in FIG. 5, while solid lines show frequency responses obtained when the band-pass filter 24 is connected in series with the PID control circuit 12 as in a configuration depicted in FIG. 6. It can be seen from FIG. 4 that, by a series connection of the band-pass filter 24 as compared to the configuration in which the band-pass filter 24 is not connected, gain has become much more stable and the gain peaks at frequencies F1 and F2 (resonant frequencies which depend on the rotation speed) have been suppressed. In FIGS. 5 and 6, a desired value is input as a signal to the excitation point of a closed loop system, this desired value being fundamentally zero in the case of a magnetic bearing device for a turbomolecular pump. The displacement of the rotor 2 is detected by the radial position sensor 8, and according to its amplitude and phase, is controlled by the PID control circuit 12 of FIG. 5 or the PID control circuit 12 of FIG. 6 and band-pass filter 24.

Here, the lower resonant frequency is expressed as $F_1$ (which corresponds to the first conical mode resonant frequency) while the higher resonant frequency is expressed as $F_2$ (which corresponds to the second conical mode resonant frequency). Although the frequency band including the conical mode resonant points may be set exactly to a range of $F_1$ to $F_2$, there are cases where such a setting harms stability dependent upon how the phase is fed back. Accordingly, the operating frequency band of the band-pass filter 24 is set to a specific range within a frequency band including resonant frequency $F_1$ to $F_3$ ($=F_1+2(F_2-F_1)$) for the sake of stabilization, where the specific range is a frequency range shifted to a high-frequency side excluding frequencies at which phase feedback is significant. While the turbomolecular pump is generally inclined to produce parallel mode resonance due to a translational motion in addition to the aforementioned conical mode resonance, the parallel mode resonance can also be suppressed by improving the stiffness by means of the band-pass filter 24.

While the foregoing discussion has mainly focused on the three-axis-controlled magnetic bearing, the aforementioned resonance-originated problems can also occur in certain cases in a five-axis-controlled magnetic bearing. The above-described configuration is also applicable for alleviating these problems.

Although the switcher 32 is changed over at frequencies immediately below and above the frequency band including the first conical mode resonant frequency and the second conical mode resonant frequency, the switcher 32 maybe switched at only one of these frequencies dependent upon how the phase is fed back.

Figure 7:
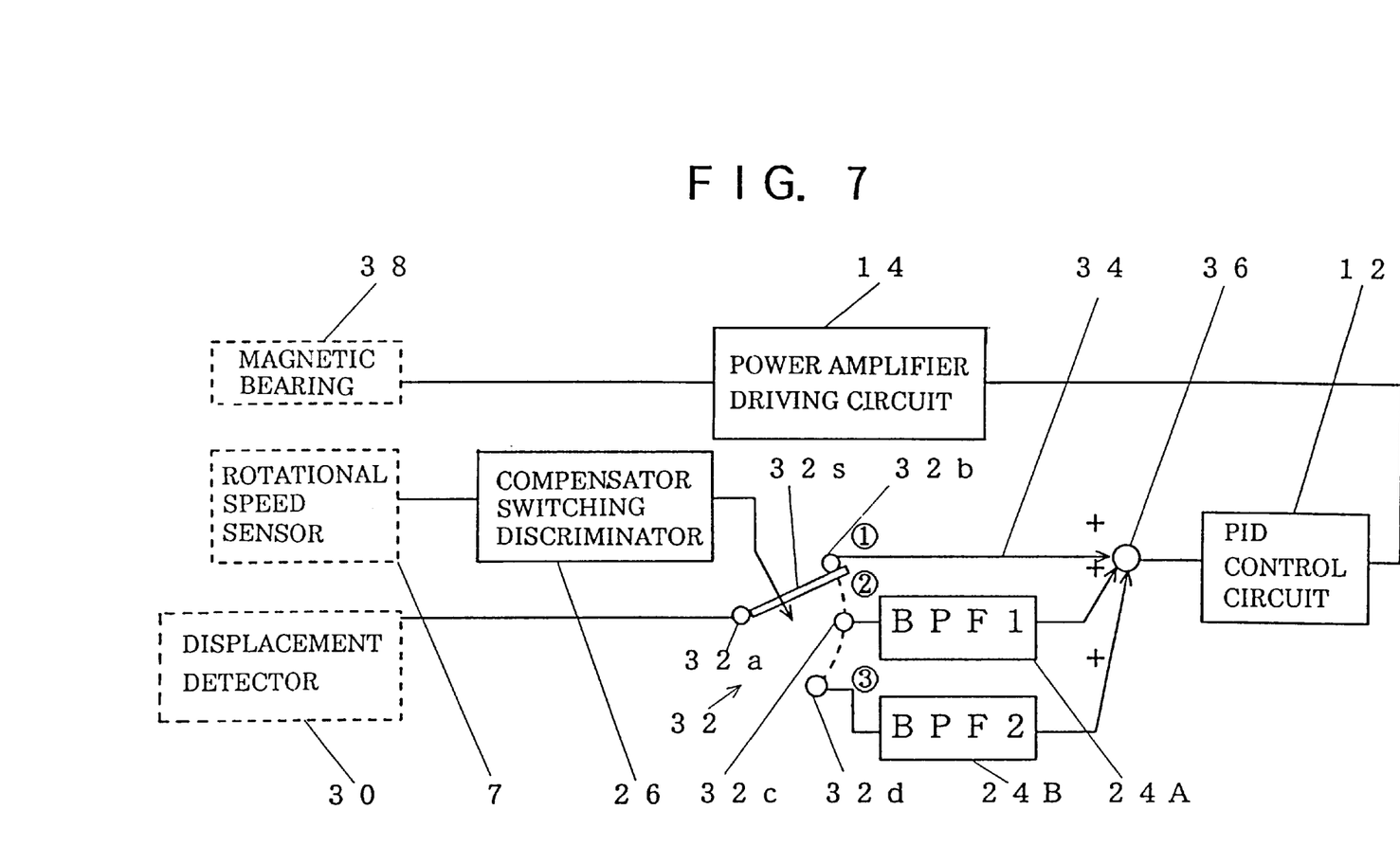
FIG. 7 is a block diagram showing a second embodiment of the invention.

FIG. 7 shows a second embodiment of the invention, in which elements identical to those depicted in FIG. 1 are designated by the same reference numerals and a description of such elements is omitted here. Referring to FIG. 7, the second embodiment differs from the first embodiment in that a switcher 32 has three outputs and two band-pass filters 24A and 24B are connected to output terminals 32c and 32d in a parallel configuration. Downstream ends of the band-pass filters 24A and 24B are individually connected a coupler 36.

Now, an operational description is given below.

Figure 8:
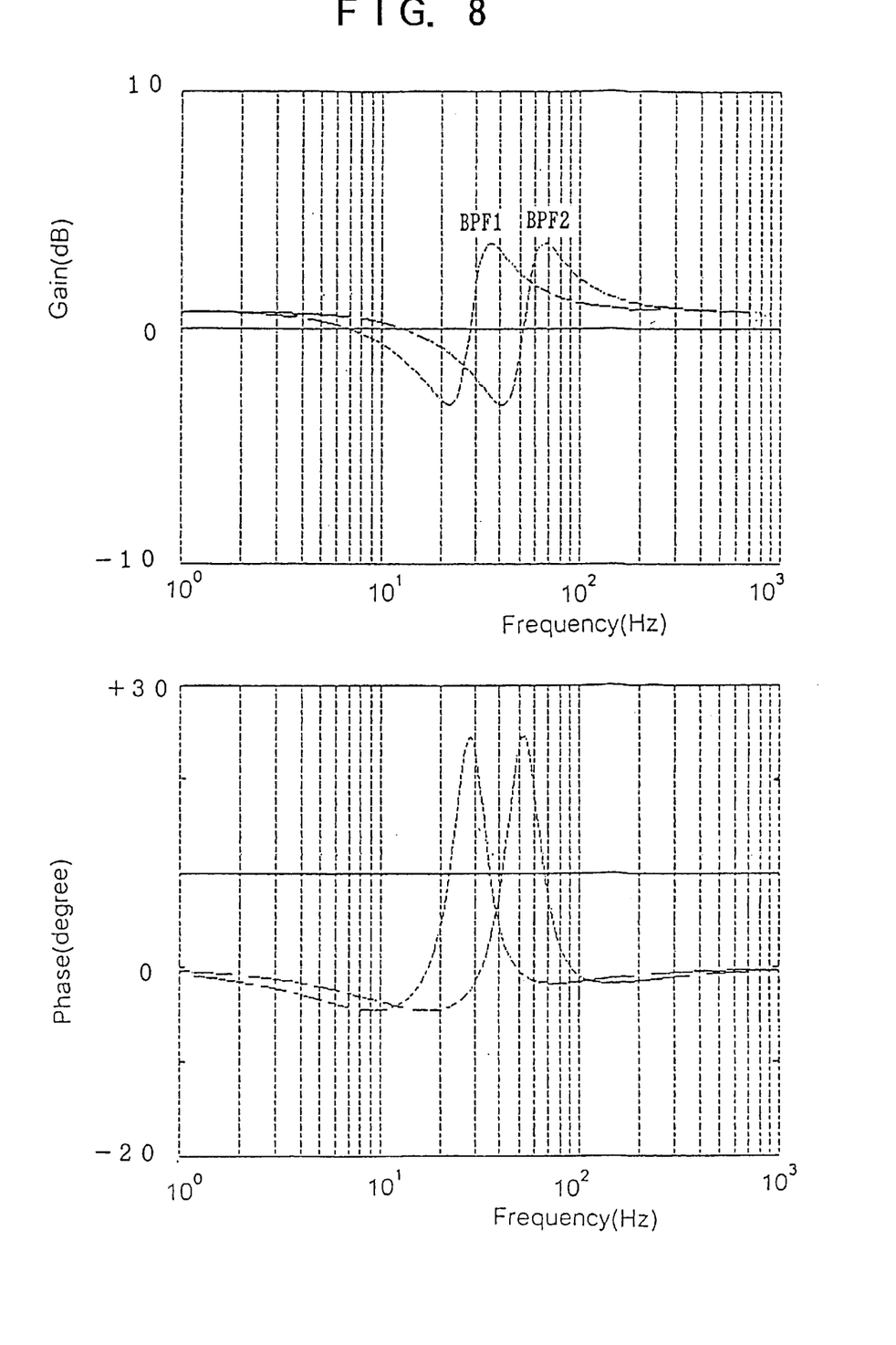
FIG. 8 shows Bode diagrams of band-pass filters capable of improving stiffness exclusively at both first and second conical mode resonant frequencies.

The band-pass filter 24A and the band-pass filter 24B have operating frequency bands including resonant frequencies $F_1$ and $F_2$, respectively, as shown in Bode diagrams of FIG. 8. In other words, the band-pass filter 24A and the band-pass filter 24B are compensators dedicated to the first conical mode and the second conical mode, respectively. A switch 32s of the switcher 32 is therefore connected to the output terminal 32c when the revolving speed is between 1,000 and 3,000 rpm, for instance. The switch 32s is connected to the output terminal 32d when the revolving speed falls within a range of 3,000 to 6,500 rpm, while the switch 32s is connected to an output terminal 32b when the revolving speed is in ranges of 0 to 1,000 rpm, and 6,500 rpm and over. The switcher 32 is provided with an interlock mechanism to avoid misoperation, whereby the switch 32s is always connected to one of the output terminals. The earlier-mentioned first embodiment employs a single compensator to cover both the first and second conical mode resonant points and, in this sense, the first embodiment takes a compromise solution with respect to the improvement in stiffness. Contrary to this, the second embodiment can provide an optimum improvement in stiffness for both the first and second conical mode resonant points.

Although the band-pass filter 24A and the band-pass filter 24B act as compensators dedicated to the first and second resonant points, respectively, it is possible to employ a plurality of band-pass filters and configure them to form such a circuit that provides as a whole an operating frequency band covering the first and second resonant points. In this case, the switcher 32 is changed over at points of a plurality of revolving speeds which include the frequencies immediately below and above the first conical mode resonant frequency and the second conical mode resonant frequency. These changeover points may further include frequencies where gain characteristic curves of the band-pass filters intersect, for example.

As described above, one construction of this invention (claim 1) is such that the first compensating means is provided between the displacement arithmetical means and the second compensating means. Consequently, stiffness can be improved in a frequency band including at least the first conical mode resonant frequency and the second conical mode resonant frequency. This arrangement makes it possible to suppress both conical mode resonance and parallel mode resonance.

Another construction of the invention (claim 2) is such that an electrical connection is switched to the conductor or the first compensating means depending on the revolving speed of the rotor. This makes it possible to selectively prevent undesirable consequences arising from the conical mode resonance occurring only in the frequency band including the first conical mode resonant frequency and the second conical mode resonant frequency.

In still another construction of the invention (claim 3), a plurality of compensating means are parallel-connected and an electrical connection is switched to the conductor or one of the compensating means depending on the revolving speed of the rotor. This makes it possible to provide stiffness compensation best suited to the first conical mode resonant frequency and the second conical mode resonant frequency.

In yet another construction of the invention (claim 4), the compensating means is a band-pass filter which improves stiffness in a specific range within a frequency band including the first conical mode resonant frequency $F_2$, the second conical mode resonant frequency $F_2$ and a third frequency $F_3$. It is therefore possible to provide stable stiffness compensation, free from such adverse influence as phase feedback.

What is claimed is:

1. A magnetic bearing device comprising:
   a radial position sensor for measuring the position of a rotor in its radial direction;
   displacement arithmetical means for processing a displacement measured by the radial position sensor;
   first compensating means for improving stiffness in a frequency band including at least a first conical mode resonant frequency and a second conical mode resonant frequency upon receiving an output of the displacement arithmetical means;
   second compensating means for correcting an output of the first compensating means;
   power amplification means for power-amplifying an output of the second compensating means; and
   a radial electromagnet for controlling the position of the rotor in its radial direction based on an output of the power amplification means.

2. A magnetic bearing device comprising:
   a radial position sensor for measuring the position of a rotor in its radial direction;
   displacement arithmetical means for processing a displacement measured by the radial position sensor;
   a rotational speed sensor for measuring the revolving speed of the rotor;
   first compensating means for improving stiffness in a frequency band including at least a first conical mode resonant frequency and a second conical mode resonant frequency upon receiving an output of the displacement arithmetical means;
   compensation switching means for connecting an output of the radial position sensor to one of a conductor and the first compensating means depending upon whether the revolving speed measured by the rotational speed sensor coincides with preset revolving speed data;
   second compensating means connected to the conductor and the first compensating means for correcting an output of the compensation switching means;
   power amplification means for power-amplifying an output of the second compensating means; and
   a radial electromagnet for controlling the position of the rotor in its radial direction based on an output of the power amplification means;
   wherein the preset revolving speed data comprises a range of revolving speeds including the first conical mode resonant frequency and the second conical mode resonant frequency.

3. A magnetic bearing device according to claim 2; wherein the first compensating means comprises at least two compensating devices for compensating at different frequency bands, and including a first compensating device for compensating at a first frequency band including the first conical mode resonance frequency and a second frequency band including the second conical mode resonant frequency; and the compensation switching means includes means for connecting the conductor or one of the compensating devices to the next stage of the displacement arithmetical means when the revolving speed measured by the rotational speed sensor coincides with the preset revolving speed data, and the preset revolving speed data defines a plurality of revolving speeds including those occurring below and above the first conical mode resonant frequency as well as those occurring below and above the second conical mode resonant frequency.

4. A magnetic bearing device according to any one of claims 1, 2 or 3; wherein the compensating means comprises a band-pass filter which improves stiffness in a specific range within a frequency band including the first conical mode resonant frequency $F_1$, the second conical mode resonant frequency $F_2$ and a third frequency $F_3=F_1+2(F_2-F_1)$.

5. A magnetic bearing device comprising: a radial position sensor for measuring radial displacement of a rotating body; first compensating means for improving stiffness in a frequency band including at least a first conical mode resonant frequency and a second conical mode resonant frequency based upon the measured rotor displacement; second compensating means for correcting an output of the first compensating means; a radial electromagnet for controlling the radial position of the radial body; and means for driving the radial electromagnet in accordance with an output of the second compensating means.

6. A magnetic bearing device according to claim 5; wherein the first compensating means comprises a band-pass filter, and the second compensating means comprises a PID control circuit.

7. A magnetic bearing device according to claim 5; further comprising a rotational speed sensor for measuring the revolving speed of the rotating body; and compensation switching means for connecting an output of the radial position sensor to one of a conductor and the first compensating means depending upon the measured revolving speed of the rotating body; wherein the compensation switching means connects the output of the radial position sensor to the conductor so that the output of the radial position sensor is input directly to the second compensating means when the measured revolving speed is outside a predetermined range, and the compensation switching means connects the output of the radial position sensor to the second compensating means through the first compensating means when the measured revolving speed is within the predetermined range, the predetermined range including the first conical mode resonance point and the second conical mode resonance point.

8. A magnetic bearing device according to claim 7; wherein the first compensating means comprises a band-pass filter, and the second compensating means comprises a PID control circuit.

9. A magnetic bearing device according to claim 7; wherein an upper limit of the predetermined range is greater than a frequency $F_3=F_1+2(F_2-F_1)$, wherein $F_1$ is the first conical mode resonance point and $F_2$ is the second conical mode resonance point.

10. A magnetic bearing device according to claim 5; wherein the first compensating means comprises a plurality of band-pass filters, each for improving stiffness of the rotating body in a different frequency band.

* * * * *